INVENTOR
LLOYD A. JOHNSON
BY
ATTORNEY

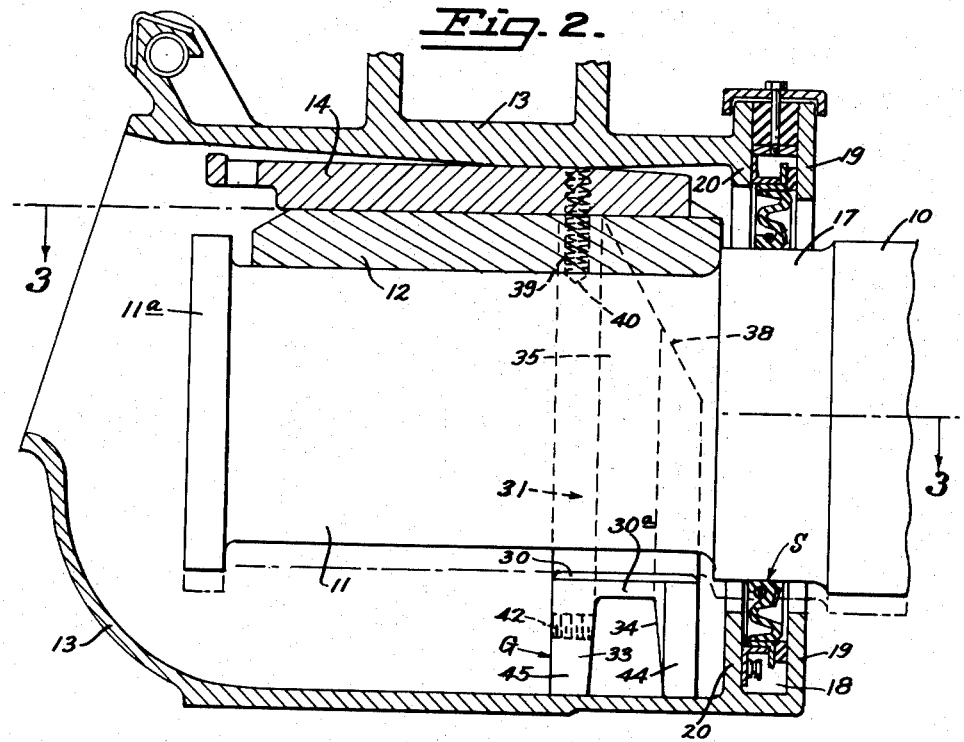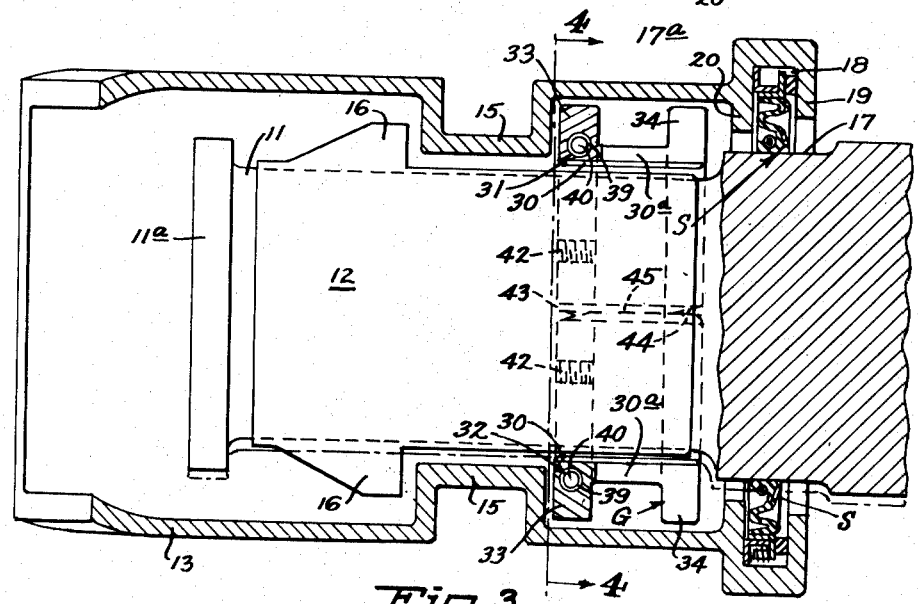

Oct. 27, 1953     L. A. JOHNSON     2,657,102
GUARD BEARING

Filed April 28, 1953     5 Sheets-Sheet 3

INVENTOR
LLOYD A. JOHNSON
BY
ATTORNEY

Oct. 27, 1953
L. A. JOHNSON
2,657,102
GUARD BEARING
Filed April 28, 1953
5 Sheets-Sheet 4
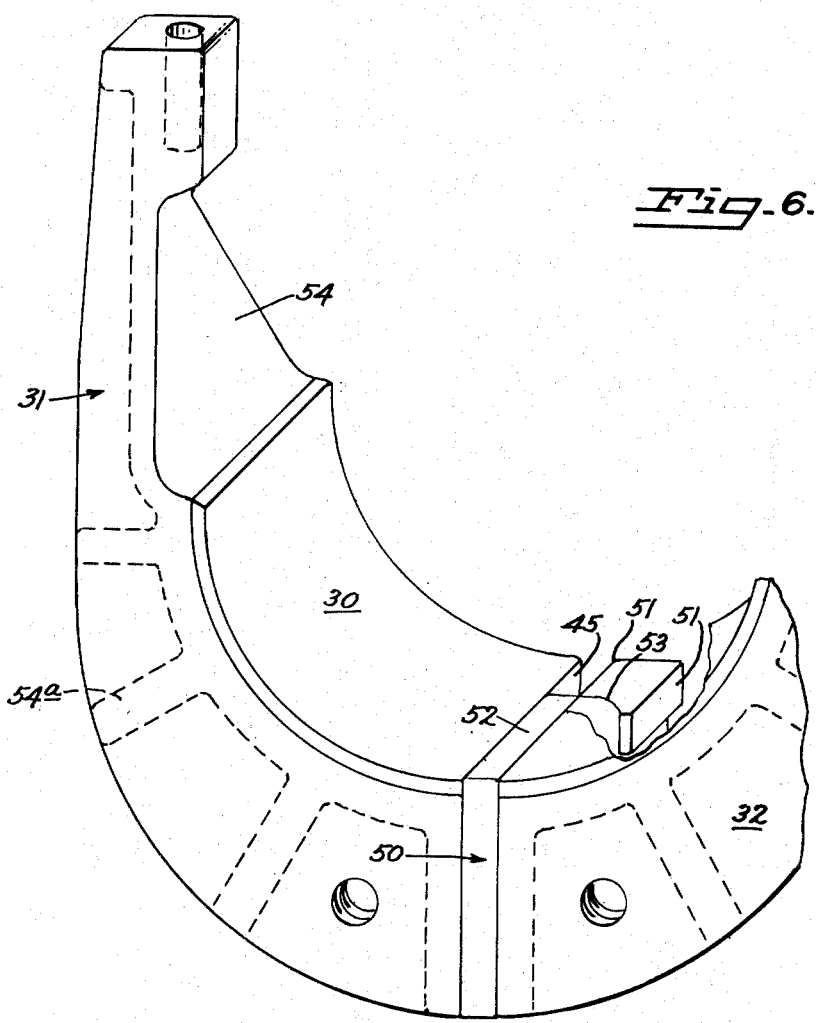
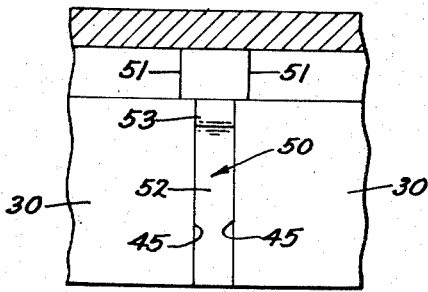
INVENTOR
LLOYD A. JOHNSON
BY
ATTORNEY.

Oct. 27, 1953 — L. A. JOHNSON — 2,657,102
GUARD BEARING

Filed April 28, 1953 — 5 Sheets-Sheet 5

INVENTOR.
LLOYD A. JOHNSON
BY
ATTORNEY

Patented Oct. 27, 1953

2,657,102

UNITED STATES PATENT OFFICE 2,657,102

GUARD BEARING

Lloyd A. Johnson, Woodside, Calif., assignor to National Motor Bearing Company, Inc., Redwood City, Calif., a corporation of California Application April 28, 1953, Serial No. 351,705

11 Claims. (Cl. 308—38)

This invention relates to guard bearing members designed to protect the rotating sealing surfaces of railroad car axles, and in particular to a guard device to protect the "dust guard seats" of axles, in the journal boxes of railroad cars and the like, from damage resulting from movement of the journal box housing into contact with the dust guard seat.

It is significant, as the prior art will show, that for over 75 years inventors have been trying device after device seeking to find a practical solution to the sealing and lubricating problems existing in railroad car trucks having plain journal bearings.

The bulk of the railroad cars in use today, excluding those using roller bearings, utilize journal boxes or housings having openings at one end for one journal end of the truck axles. These housings are supported by brasses (bearings) which ride on the top portion of the rotating axle journal and have roughly cast slots or dust guard wells to receive whatever device is provided for closing the gap between the housing and the axle where the axle enters the housing. Such a sealing device, whether it be a carefully constructed resilient oil seal or merely a crude dust guard, is held in place in retaining walls forming the cast dust guard slot or well and it rides on a smoothly machined surface of the axle adjacent the journal and is called a "dust guard seat."

Success in solving the sealing problem has required solution of the problem growing out of the relative longitudinal shifting of the journal box with respect to the axle shaft, which is an inescapable incident of all phases of railroad car movement and handling. This shifting accompanies the braking action or it comes with the routine of coupling, starting, switching, or moving of the cars. In car coupling, for example, the train crew often bumps the cars harder than intended so this longitudinal shifting produces severe shocks.

When these shocks are sufficiently severe, the rough edge of the retaining walls forming the dust guard slot or well, actually hit against the dust guard seat and dig into the metal surface to form score marks and corresponding burrs on the smoothly machined sealing surface. These protruding burrs are often sharply pointed or have jagged edges. Severe scoring of the dust guard seat also follows a prolonged period of running with the axle shifted longitudinally during the braking.

When a resilient oil seal is riding on the dust seat to retain a lubricant bath in the journal box, the presence of these score marks and burrs greatly interferes with an effective seal. It is evident that the oil will flow through the grooved path provided by the score mark on the dust seat, and may pass under the sealing lip of an otherwise effective sealing member riding thereon. But more often than not, the protruding metal burrs will tear at the relatively soft material of the lubricant seal causing damage and destruction of the sealing member itself.

In the past damage to the dust guard seat has contributed to failure of lubrication and to shaft failure. This required the affected car to be taken out of service to dismantle the axle and journal box for the repair.

Earlier attempts at holding the axle in place in the housing have proven impractical. These began at least as early as 1890 in the Bemis Patent 425,973. Other early attempts at solving the problem are shown in the following patents: Thomas (1907) 872,695; Stephens (1913) 1,063,616, (1916) 1,197,870 and (1922) 1,411,127; Hartell-Law (1918) 1,254,800 and Bary (1936) 2,059,167. None of these devices is approved for or in use on railroad trucks today. Their impracticability will become apparent as the present invention is explained.

The present invention is directed to a simple guard bearing adapted for quick insertion and removal from an existing journal box in which the railroad axle journal is projecting into the box and for self support when called upon to protect the dust guard seat on the railroad axle from being gouged or scored by movement against the journal box housing; and one object of the invention is to provide a carefully shaped guard bearing member having bearing surfaces spaced from the axle journal to limit the ultimate relative movement other than rotation between the axle journal and the journal housing and provide a bearing surface for the journal to rotate against while the guard bearing and journal are in contact.

One problem solved by this invention is to provide a side or guard bearing which will be engaged by the journal shaft whenever the application of braking pressures combine with other forces present to move the axle longitudinally toward either inside wall of the journal box, or when the movement is of the journal box toward the axle, or is a combination of both.

Another object of the invention is to provide a guard bearing member that can be readily inserted in or removed from existing journal box structures without necessitating any structural changes in the latter.

Another object is to devise a separable guard bearing member that may be easily installed or removed, yet which because of its shape will be held against rotation whenever the journal comes in contact with its bearing surface, and will have the necessary strength and rigidity to resist the extreme shocks to which the journal box elements are subjected.

Another object is to provide a guard bearing member that is rugged and durable and yet which is simply constructed, easily installed, easily removed, relatively inexpensive, and simple to manufacture.

Another object of this invention is to provide a guard bearing member that will be a final stop for the axle when operating conditions cause the housing and the shaft to shift longitudinally relatively.

Other objects and advantages of the present invention will be apparent from the following description and from the drawings in which:

Fig. 2 is a view in vertical section of the journal box of Fig. 1, with the axle journal shown in elevation;

Fig. 3 is a view in horizontal section along the line 3—3 of Fig. 2;

Fig. 6 is a view in perspective of a pair of guard bearings of modified form as they would be positioned in a housing;

Fig. 7 is a fragmentary plan view of the guard bearings of Fig. 6 showing how the positioning member serves to space them from contact with the end wall of the journal box.

Figure 1:
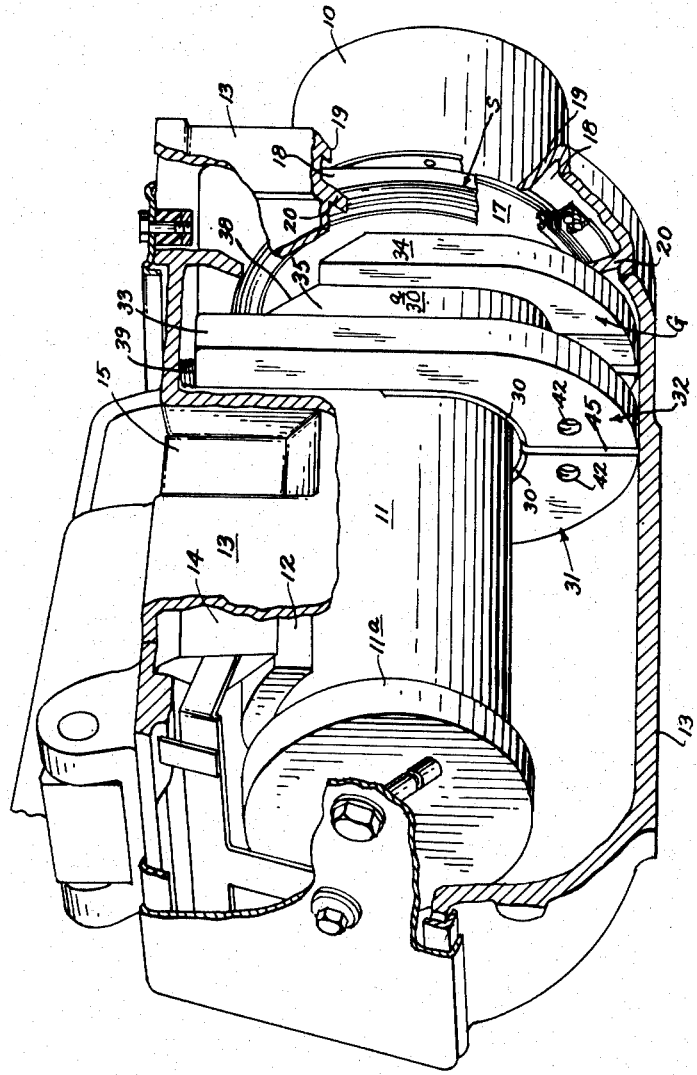
Fig. 1 is a perspective view of a typical journal box and axle journal, broken away in part to show one form of the novel dust seat guard bearing of the present invention installed in its operating position.

I have discovered that a new functioning comes about from the novel shape of the guard bearing members. One novel feature in shape of the guard bearing member (two are used in each journal box) is to have it generally J-shaped with the cross sectional distance between the bearing surface (inside) and the supporting surface (outside) greater at the lower end than at its upper end. In other words, the vertical part of the member is thinner than the lower part of the member. This novel shape means that when the journal and the guard bearing surface come into contact and the tendency is for the journal to rotate the guard bearing in the direction of its thin upper end, the guard bearing will be held against rotation due to its shape. The greater the rotational force applied, the greater will be the holding power of the guard bearing resisting rotation in the housing. And yet when the guard bearing parts are out of contact with the shaft each is relatively loose in the housing and each can easily be removed and replaced. And when the two J-shaped members are in place in the housing with their lower ends in close proximity to each other, they support each other in the ready position with their bearing surfaces spaced away from the journal.

Thus, broadly viewed, my invention contemplates a guard bearing, adapted for quick insertion or removal from a journal box in which the railroad axle journal may be projecting into the box and for self support when called upon to function in absorbing any remaining force arising from longitudinal movement of the journal with respect to said box occasioned by the braking action or by the sudden stopping or starting of the vehicle supported on said axle, which guard bearing includes a generally J-shaped rigid member, having a bearing surface on its inner face of general configuration to match a like surface on said journal but normally positioned in said housing with said bearing surfaces out of contact, and having its lower outer contour formed to provide a support surface adapted to bear on the bottom and on the side of said journal box, and in which the cross-sectional distance between said bearing surface and said support surface is greater at the lower end of said member than at its upper end, whereby said guard member will be held against rotation in said box whenever the aforesaid bearing surfaces come into contact.

Referring to the drawings, the numeral 10 indicates the axle of a railroad car having a reduced extending journal bearing portion 11 with an end flange 11a. Riding on and partially covering the top half of the rotating axle journal portion 11 is a brass (bearing) 12. Each brass 12 provides a supporting base for its respective journal box housing 13 and spring connections between the various housings and the car body. Interposed between the brasses 12 and the housings 13 are wedges 14 to insure even distribution of the load on the different axle journals.

Each housing 13 has opposing bosses or indentations 15 which cooperate with flanges 16 on the brasses to limit the inward axial movement of the axle journal with respect to the journal housing (Fig. 3).

A portion of the axle 10 adjacent the journal portion 11 is carefully machined to provide a smooth dust guard seat 17. Surrounding and spaced from the bottom and sides of the dust guard seat 17, the housing has a roughly cast U-shaped slot 18 having retaining walls 19 and 20 with rough edges.

For over half a century the housing retaining walls and slot 18 were used to hold a crude dust guard of one sort or another, against the machined dust seat 17 to seal out dust and dirt from the road bed, and to hold in oily waste material used to lubricate the rotating journal from underneath.

For years, the railroad industry has contrived to perfect an effective oil seal permitting a bath of lubricant about the rotating axle journal portions in the journal housings. One such sealing member, indicated generally by the letter S, is fully described in copending application, Serial No. 335,628 filed February 9, 1953 by Lloyd A. Johnson, Ezra D. Mosher and Clifford A. Stephens, where its structure is claimed. The illustrated sealing member S includes an encircling diaphragm of a resilient material that allows complete freedom of relative movement between the dust guard seat and the journal housing without any loss of effective sealing characteristics.

One deterrent to the most effective use of such lubricant seals as the sealing member S has been the tendency of the slot walls 19 and 20 to contact and damage the dust guard seat 17 whenever the car axles 10 shift longitudinally. Such contacts are the result of unusual impacts due to conditions of car coupling, braking, jerky starting, or to defective road beds or derailments, which have sufficient force to move the axle and housing momentarily out of their normal longitudinal alignment. When such contacts occur, the rough cast corners of the slot walls 19 and 20 rub on the smooth metal of the dust guard seat 17 often resulting in deep score marks, corresponding burrs, dents and gouged sections. As previously explained, these damaged areas have a very detrimental effect on the sealing efficiency of any sealing member riding on the dust seat. This is true even where waste is used to contain and apply the lubricant for a scored axle shaft will pick up waste and carry it against the edge of the brass where it lodges and wipes the bearing dry of oil. In time a hotbox develops and trouble ensues. This invention, therefore, has an important application regardless of what form of lubrication or sealing is being used.

A preferred form of the device of the present invention (see Fig. 4) includes a J-shaped guard bearing device, of which there are two, supported against the bottom and adjacent the side walls of the journal housing 13 with their lower ends abutting or in close proximity. Each guard bearing is provided with an inner curved bearing surface 30 spaced away from the extending journal bearing portion 11. Upon contacts of the type described, the axle journal will be cradled on the bearing surface 30 of either guard G with the dust guard seat stopped short of making contact with the slot walls 19 or 20. This contact of the journal 11 against the surface 30 is usually in about the 4 or 8 o'clock position on the journal, instead of the 3 or 9 o'clock position, because to move sideways, i. e., longitudinally, the journal 11 must also move downwardly or the housing upwardly. As shown in dotted lines in Fig. 4, when the axle and journal box shift position relatively it usually results in the brass 12 shifting its position relative to the wedge 14.

Figure 4:
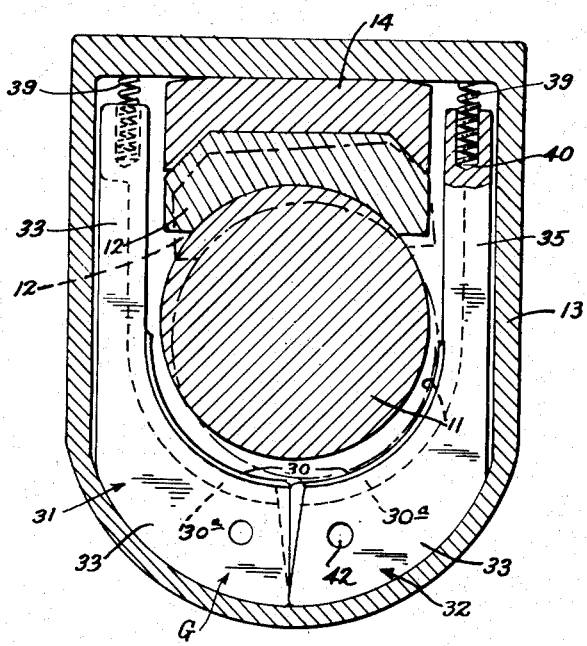
Fig. 4 is a view in transverse section along the line 4—4 of Fig. 3.
Figure 9:
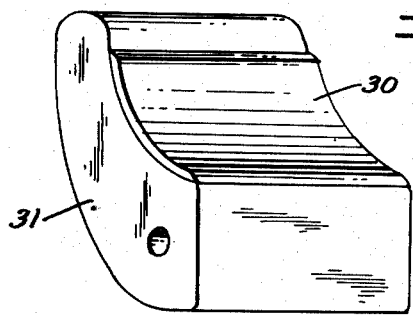

As stated, the guard bearing device G when installed comprises two guard bearing members 31 and 32 which are substantially alike in structure. The left hand guard bearing 31 is shown in perspective in Fig. 5. When the two J-shaped portions are installed in operating position, the combined structure is generally U-shaped, as shown in Figs. 4 and 6, presenting an inner curved bearing surface 30 of substantial area. The width of this bearing surface can be varied to suit any designer's choice. Fig. 9 shows it in a wide form.

Preferably behind the surface 30a each guard bearing is relieved so as to save weight. This provides two outer rectangular portions or runners 33 and 34. The lower inner and outer edges of each runner are curved; the inner edge 30a to correspond generally to a smooth curve for contact with the journal portion 11 and the outer edge to fit the floor and side wall of the housing 13. At the upper end of each J-shaped guard member, the runners and the surface 30a merge into a narrower triangular portion 35 which extends vertically adjacent the inner side walls of the housing 13. The runners 33 on the outer face are longer than the back runners 34 and form a part of the upwardly extending arm 35. When installed, the upper end of the arm 35 is close to the top wall 13 of the housing. A substantial portion of both the rear runner 34 and the central portion 30a may be cut away to form an angular sliding surface 38 to facilitate insertion, as will be described later.

When installed, the guard bearing device G may be held in the proper position in contact with the lower curved wall of the housing by compression springs 39 which are retained in cylindrical bores 40 in the upper ends of the front runner portions 33 of each of the guard bearings 31, 32. Each spring bears against the upper wall of the housing 13. In this way, the vertical faces 45 on each block are pressed into contact and the guard bearing device G is held in position on the bottom curved wall of the journal housing 13. These springs in some applications may be desirable to take up dimensional variations and do not interfere with the self supporting feature of the guard bearings when in the housing.

The guard bearing G is held generally in the desired vertical position by the adjacent slot wall 20 and the stop indentations or bosses 15 of the housing 13. Any tendency of the guard bearing G to tilt sideways, so that the bottom portions of the runners 33 and 34 would slide outwardly into the space below the journal portion 11, will be resisted by the downward pressure of the positioning springs 39 near the forward edge of the blocks. Where these springs are omitted, as in the case of Figs. 6 and 8, the two guard bearing members 31, 32 may be held secure enough for the purpose by the positioner 50, or without any spring or special holding means.

Installation of each dust seat guard bearing is accomplished when installing the seal S. This occurs just after the flanged end 11a of the shaft 10 has been pushed through the seal S into the journal housing 13 to a position just beyond the bosses 15. At this point, the housing 13 is lowered in relation to the axle to provide the maximum space under the axle portion 11 and the flanged end 11a.

The right hand guard bearing 32 is now inserted into the journal housing 13 by hand or by means of a handle 41 threaded into a tapped bore 42 provided in the forward runner 33. The guard bearing 32 is tilted up so that the angular sliding surface 38 is generally parallel to and slides along over the inside lower wall of the housing 13. The handle 41 may then be used to apply leverage to the bearing to lift it into its normal vertical operative position between the slot wall 20 and the right hand boss 15.

Figure 5:
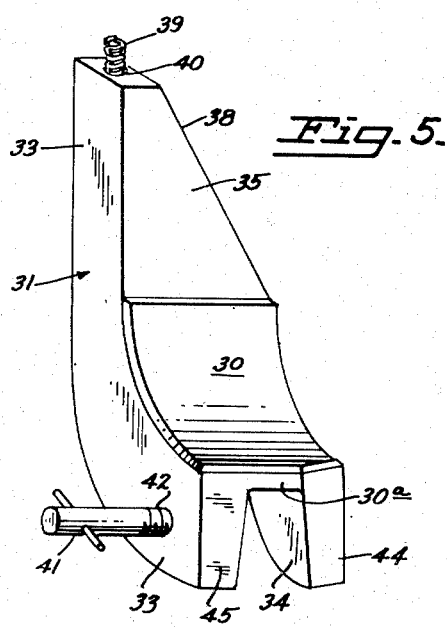
Fig. 5 is a perspective view of one of the separable portions of the guard device showing a handle in place which is utilized during installation and is then removed.

It will be noted (Figs. 3 and 4) that the lower vertical face 45 of the right hand bearing 32, is chamfered adjacent the front runner 33 to form a cam face 43; while the like face 45 of the left hand bearing 31 is provided with a chamfered cam face 44 adjacent the rear runner 34, as shown in Fig. 5.

The purpose of these chamfered faces 43, 44 is to provide clearance when the bearings 31, 32 are installed. As previously indicated, the right hand bearing 32 is installed first. Its chamfered forward edge 43 cooperates with the chamfered rear edge 44 of the left hand bearing 31 to allow the left hand bearing to slide into operative position. These chamfered faces are not required where the faces 45 are spaced apart to receive in the gap the guard bearing positioner 50 (see Figs. 6 and 7).

In operation, the two guard bearing members provide on each one a bearing surface 30 which is at all times more closely spaced to the journal portion 11 of the axle 10 than are the slot walls 19, 20 to the smoothly machined dust guard seat surface 17. Should operating conditions move the journal housing relative to the axle, or vice versa, the latter will contact the guard G and prevent any contact of the axle journal or dust guard seat with the housing.

An advantage of having the bearing surface 30 carefully finished and preferably with a radius generally corresponding to that of the shaft journal portion 11 is that when impact occurs the force is dissipated over a greater area.

Further protection to the journal 11 is afforded by the fact that the surface 30 is usually covered by the lubricant in the housing.

The modification shown in Figs. 6 and 7 makes it preferable to have the adjacent faces 45 flat and spaced apart enough to receive the bearing positioner 50 which may be made of molded rubber or synthetic material or any other suitable soft material like lead or bronze. The bearing positioner may have two projections 51 near its upper back corner which lock behind the edges of the guard bearings (Fig. 7) and space the latter from the end wall of the housing. The positioner is easily inserted before the journal 11 is lowered in the housing and once the latter is in place it cannot get out because of the projections 51 and the fact that its upper edge 52 is closely adjacent journal bearing 11. The edge 52 is relieved at 53 to allow the dust guard seat shoulder 17a to move axially without contacting it. Clearance from the guard bearings 31, 32 for the dust guard seat shoulder 17a is assured by the projections 51 on the bearing positioner.

The modified guard bearings may be relieved, as at 54, to facilitate insertion of the journal flange 11a, and may also have radial ribs 54a between the runners to give added strength.

Figure 8:
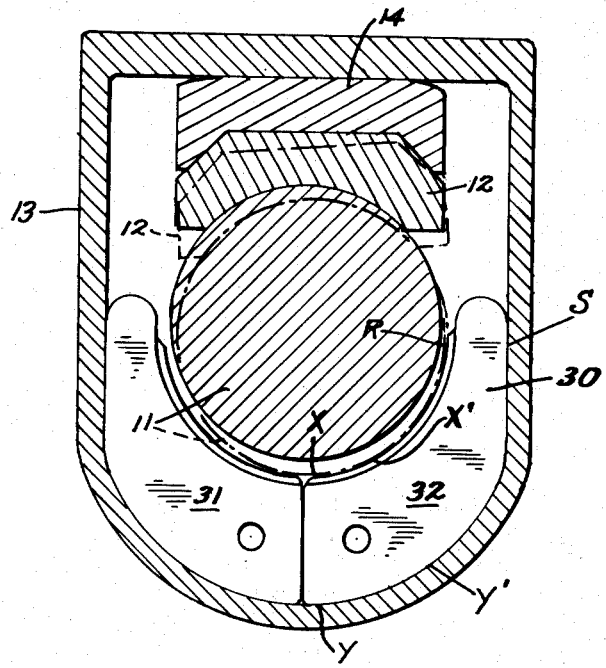
Fig. 8 is a view like Fig. 4 showing a construction where the upper leg of each J-shaped guard bearing is shortened and Fig. 9 is a view like Fig. 5 showing the guard bearing of Fig. 8 with the short vertical leg.

The modification in the guard bearing structure shown in Figs. 8 and 9 show two variations, either of which may be used, singly or together. In this construction, each J-shaped guard bearing member 31, 32 is made with the lower end of the member thicker from X to Y than the thickness of the upper leg of the J member from R to S, just as in the case of the forms shown in Figs. 1 to 7, inclusive. Where it differs is in having the upper or vertical leg of the J shortened. Since this means the leg is not present to bear against the boss 15 in the box, some other means may be provided or not as the particular engineer may choose, to keep it from moving axially in the housing. Such other means could be an oiler frame or any number of other positioning mechanisms. The J-shaped guard members 31, 32, shown in Figs. 8 and 9, may be left loose in the bottom to find their own position along the axis of the journal 11.

The other variation shown in Figs. 8 and 9 is in the width, that is the width measured along the axial length of the journal 11, of the bearing surface 30. Here it is wider than in Figs. 1 to 7, but this is an engineer's choice.

Reference was made earlier to one feature of the new functioning which comes about from the novel shape of the pair of mating J-shaped guard bearing members 31, 32. Fig. 8 shows this new shape where the member is wider from X to Y than from R to S. This novel shape means that when the journal 11, rotating in a counterclockwise direction, comes into the dotted line position in contact with the bearing face 30 on the guard member 32, it will tend to carry the guard member 32 along with it in a counterclockwise direction. Even though the guard member 32 is only resting loosely in the bottom of the journal box, the pressure of the journal 11 on the bearing face 30 coupled with the shape of the member 32, that is, the thick end X to Y, will immediately cause it to be held against rotation. If the rotation of the journal 11 is clockwise and it is brought into contact with the bearing face 30 on the guard member 32 the latter will not move because the lower face of the member 32 will abut the like face of the member 31. Due to the shape of the latter, it will not move substantially, so the guard members will remain held against rotation. And yet at all times the guard members 31, 32 are loose in the housing ready to be lifted out and replaced with no conections to be severed and with no change in existing railroad journal construction.

Where the dimension X to Y is used herein, I mean it to include a construction where for one reason or another an engineer might design the bearing surface 30 so it terminates at about the position of X' in Fig. 8. In this case, the dimension X' to Y' is wider than from R to S so the same new functioning is present as above. As a matter of definition, where the term axle is used in the claims it is meant to cover the term journal, journal shaft, or axle shaft, or any other term applied in this art in describing the supporting member for the wheel of a car.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting. For example, each J-shaped guard bearing may be constructed as a solid unit without the runners or spacers 33, 34 as described, or a solid piece of bearing material may be utilized without liners.

What is claimed is:

1. In a journal box for railway trucks having a box with a bottom, side walls, a front wall with an opening and a slotted opening in the back wall, with an axle extending into the box through the latter opening, the improvement which includes in combination with said axle and box, a guard bearing member for the axle having an arcuate bearing surface facing toward the axle and spaced from the latter by a radial distance which is less than the radial distance between said axle and the slotted opening in the back wall of said box through which the axle extends, and including a supporting body having an arcuate surface portion bearing on the bottom of the journal box directly below the axle and an arm portion bearing on the side of the journal box opposite a side of the axle, whereby any radial movement of said axle toward said guard bearing member will be stopped by said guard bearing member with said axle out of contact with said slotted back wall.

2. The device of claim 1 in which the supporting body is made of rib-like spaced apart members.

3. The device of claim 1 in which there are a pair of relatively movable guard bearing members, one on each side of the axle and each having a portion bearing on the bottom of the journal box whereby any radial movement of said axle toward either of said guard bearing members will be stopped by contact with one of said guard bearing members with the axle held out of contact with said slotted back wall.

4. The device of claim 1 in which there are a pair of said guard bearing members, each of which is generally J-shaped in vertical cross-section with the lower end of each J-shaped member in abutting position with the like portion of the other, providing mutual support for said members holding them in a generally vertical position in said journal box.

5. The device of claim 1 in which there is a right and a left-hand guard bearing member, the arcuate bearing surface on said right-hand guard bearing member extending substantially to the six o'clock position at the bottom and the three o'clock position on the side and on said left-hand guard bearing member extending substantially to the six o'clock position at the bottom and the nine o'clock position on the side.

6. In a journal box for railway boxes having a box with a bottom, side walls, a front wall with an opening, and a slotted opening in the back wall, and with an axle extending into the box through the latter opening, the improvement which includes in combination with said box and axle a guard bearing for the axle having an arcuate bearing surface facing the axle and spaced from the latter by a radial distance which is less than the radial distance betwen said axle and the slotted opening in the back wall of said box through which the axle extends, and including a supporting body which bears on the bottom of the journal box from about its mid-point up to a point on the side of the journal box about in line with the horizontal diameter of the axle, whereby any radial movement of said axle will be stopped by the said guard bearing with said axle out of contact with said slotted back wall.

7. The device of claim 6 in which there are a pair of said guard bearings each supporting the other by engagement beneath the mid-point of said axle.

8. In a journal box for railway trucks having a box with a bottom, side walls, a front wall with an opening, and a slotted opening in the back wall, and with an axle extending into the box through the latter opening, the improvement which includes in combination with said box and axle, a guard bearing for the axle having an arcuate bearing surface facing the axle and spaced from the latter by a radial distance which is less than the radial distance between said axle and the slotted opening in the back wall of said box through which the axle extends, and including a supporting body having an enlarged laterally extending lower end which body bears on the bottom of the journal box from about its mid-point up to a point on the side of the journal box about in line with the horizontal diameter of the axle, whereby any radial movement of said axle will be stopped by the limited rocking movement of said guard bearing with said shaft out of contact with said slotted back wall.

9. The device of claim 8 in which there are a pair of said guard bearings, each supporting the other by engagement of their lower ends beneath said axle.

10. In a railroad journal box assembly wherein an axle is supported in the journal box which it enters from the back side through an opening bordered by a slotted radial wall, and said support permits said axle to rotate and to move axially and radially in said box, and said box has a bottom wall, side walls and an opening in its front wall, the combination with said box and said axle of a pair of guard bearings, each individually insertable through said front opening into position adjacent to the sides of said axle, each guard bearing having an arcuate bearing surface segment which faces said axle; and a supporting body with which said bearing surface is integral, said supporting body having a lower thickened supporting portion which bears on the bottom of said journal box and extends under said axle to about its medial point, and having a narrowed upwardly extending supporting portion which bears on an adjacent vertical wall of said journal box and extends at least up about sixty degrees from said medial point on said axle, whereby upon contact of said axle with either of said guard bearings, the guard bearing contacted will be supported against any substantial rotation in said housing, and will in turn hold said axle out of rubbing contact with the slotted radial wall of the opening in said box through which it projects.

11. The device of claim 10 in which said guard bearing members are each generally J-shaped in vertical cross-section, with the rounded bottom surface of each J-shaped member bearing on the bottom of said journal box, and with the lower end of each J-shaped member in abutting position with the like portion of the other, providing mutual support for said members holding them in a generally vertical position in said journal box.

LLOYD A. JOHNSON.

References Cited in the file of this patent

UNITED STATES PATENTS

| Number | Name | Date |
|---|---|---|
| 740,524 | Busenbenz | Oct. 6, 1903 |
| 1,723,498 | Blunt | Aug. 6, 1929 |
| 1,992,697 | Grandjean | Feb. 26, 1935 |
| 2,063,020 | Bary | Dec. 8, 1936 |
| 2,560,413 | Carlson | July 10, 1951 |